United States Patent [19]
Urabe et al.

[11] Patent Number: 4,845,550
[45] Date of Patent: Jul. 4, 1989

[54] METHOD AND APPARATUS FOR PROCESSING PICTURE IMAGE SIGNALS

[75] Inventors: Hitoshi Urabe; Tadashi Miyakawa; Osamu Shimazaki; Hisashi Kudo; Hideaki Kimura, all of Kaisei, Japan

[73] Assignee: Fuji Photo Film Co., Ltd., Kanagawa, Japan

[21] Appl. No.: 906,694

[22] Filed: Sep. 11, 1986

Related U.S. Application Data

[63] Continuation of Ser. No. 479,976, Mar. 29, 1983, abandoned.

[30] Foreign Application Priority Data

Apr. 14, 1982 [JP] Japan .................................. 57-62125
Apr. 16, 1982 [JP] Japan .................................. 57-63423

[51] Int. Cl.$^4$ .......................... G03F 3/08; H04N 1/46
[52] U.S. Cl. ....................................... 358/80; 358/75
[58] Field of Search .................. 358/80, 75, 75 IJ, 78

[56] References Cited

U.S. PATENT DOCUMENTS

| | | |
|---|---|---|
| 3,600,505 | 8/1971 | Dobouney .......................... 358/80 |
| 3,647,295 | 3/1972 | Dobouney .......................... 358/80 |
| 3,739,078 | 6/1973 | Pugsley et al. ...................... 358/80 |
| 3,885,244 | 5/1975 | Keller ................................ 358/80 |
| 4,314,274 | 2/1982 | Atoji et al. ........................ 358/80 |
| 4,335,398 | 6/1982 | Yamada ............................ 358/80 |
| 4,402,007 | 8/1983 | Yamada ............................ 358/80 |

FOREIGN PATENT DOCUMENTS

| | | |
|---|---|---|
| 2632003 | 1/1977 | Fed. Rep. of Germany ........ 358/80 |
| 46-42845 | 12/1971 | Japan ................................ 358/80 |
| 50-14845 | 5/1975 | Japan . |
| 53-123021 | 10/1978 | Japan . |
| 53-123201 | 10/1978 | Japan . |

OTHER PUBLICATIONS

Wyszecki, Günter et al., *Color Science*, John Wiley & Sons, Inc., New York, 1967, pp. 453–461.
James, T. M., Editor, *The Theory of the Photographic Process*, Fourth Edition, Macmillan Publishing Co., Inc., New York, 1977, pp. 519–526.

*Primary Examiner*—Edward L. Coles, Sr.
*Assistant Examiner*—Randall S. Svihla
*Attorney, Agent, or Firm*—Wenderoth, Lind & Ponack

[57] ABSTRACT

A method and process for processing picture image signals detects color separation signals of a color original image and then respectively converts these color separation signals into digital color separation signals. These digital color separation signals are then multiplied by predetermined coefficients and the results of these multiplications are sequentially accumulated for equalizing the levels of the digital color separation signals at a grey point of the original image so as to thereby obtain digital color separation signals which are converted to equivalent neutral densities. Hue signals of yellow, green, cyan, blue, magenta, and red which divide a color space into six hues are obtained from the digital color separation signals which are converted to the equivalent neutral densities. The hue signals are multiplied by predetermined color correction coefficients and the results thereof accumulated for color correction signals on yellow, magenta, and cyan. The digital color separation signals which are converted to the equivalent neutral densities are added to the color correction signals so as to thereby obtain selective color correction signals for recording the original image.

20 Claims, 6 Drawing Sheets

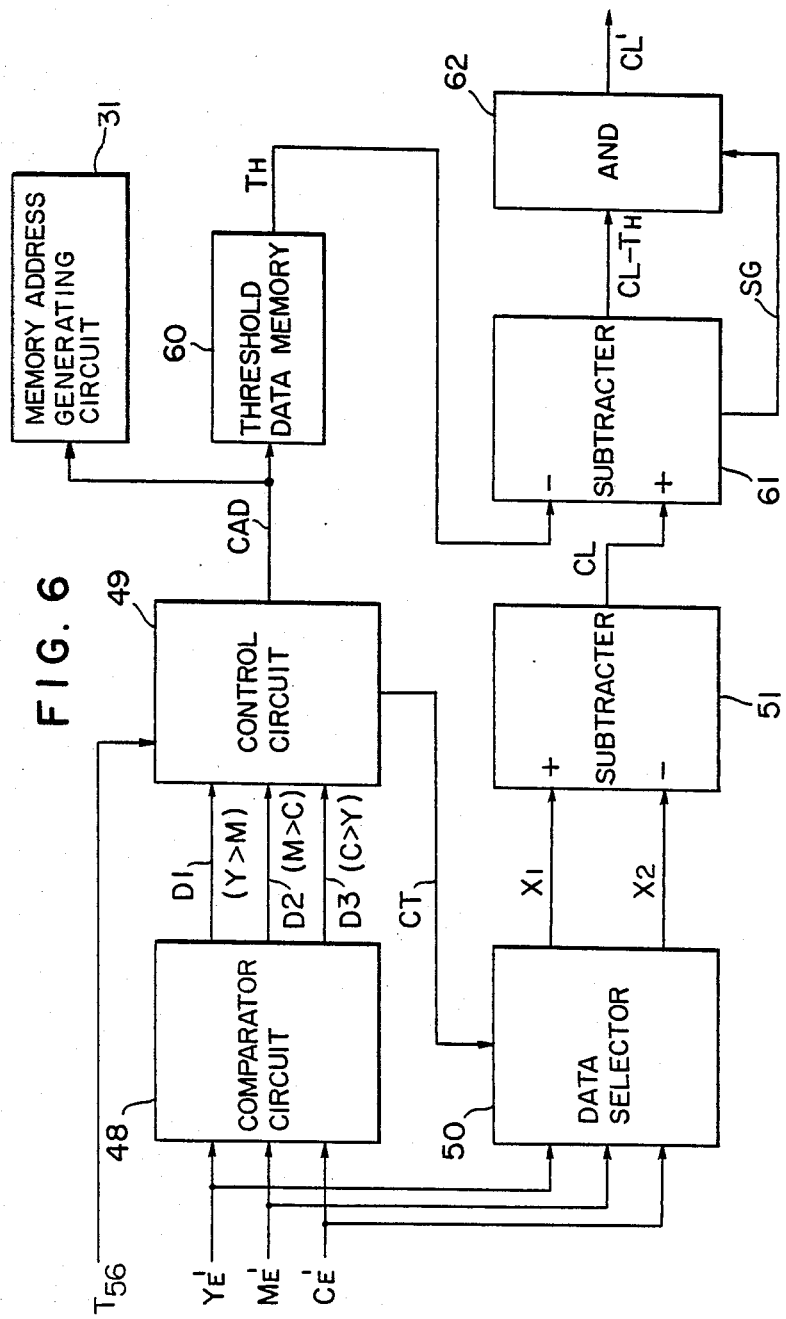

METHOD AND APPARATUS FOR PROCESSING PICTURE IMAGE SIGNALS

This application is a continuation of now abandoned application Ser. No. 479,976, filed Mar. 29, 1983.

BACKGROUND OF THE INVENTION

This invention relates to a digital color correction method which separates and corrects the colors of an original color image by photo-electronic scanning and then outputs picture image signals for reconstructing a color picture image and the apparatus therefor.

In the color tone correction generally conducted by scanners, etc., in addition to the basic masking for eliminating improper absorption of ink colors, there is provided means for removing distortion of colors or for slightly correcting the tone of a particular hue according to the taste of an individual operator. Such a correction is achieved by discriminating the hue and saturation of an original image with the basic three color signals and by adding appropriate correction signals to the basic signals. FIG. 1 shows an example of the structure disclosed in Japanese Kokoku No. 50-14845 wherein the color separation signals B, G, R, obtained by photo-electronic scanning using color separation filters of blue (B), green (G) and red (R), are converted to density signals $Y_0$, $M_0$, $C_0$ in logarithmic conversion circuits 1 through 3. The density signals $Y_0$, $M_0$, $C_0$ are fed to masking circuits 4 through 6 and converted to the corrected density signals $Y_1$, $M_1$, $C_1$. The masking circuits 4 to 6 perform computations such as $Y_1 = Y_0 - aM_0 - bC_0$ supply corrected density signals $Y_1$, $M_1$, $C_1$ to a color correction signal generating circuit 7 which outputs color correction signals $Y_C$, $M_C$, $C_C$ which correspond to density signals $Y_1$, $M_1$, and $C_1$. The color correction signal $Y_C$ is, for example, of a form of $Y_C = a_1 \cdot (Y) + a_2 \cdot (G) + a_3 \cdot (C) + a_4 \cdot (B) + a_5 \cdot (M) + a_6 \cdot (R)$. The other color correction signals $M_C$ and $C_C$ are of a similar form. The symbols (Y), (G), ..., (R) denote the hue signals formed in the color correction signal generating circuit 7. The color correction signals $Y_C$, $M_C$, $C_C$ are respectively inputted to the subtracting terminals of subtracters 8 through 10 and the density signals $Y_1$, $M_1$, $C_1$ from the masking circuits 4 through 6 are respectively inputted to the adding terminals thereof; the subtracters 8, 9 and 10 output signals $Y_2 = Y_1 - Y_C$, $M_2 = M_1 - M_C$, $C_2 = C_1 - C_C$, respectively. The coefficients a, b mentioned above may be arbitrarily varied by a potentiometer, etc., and the coefficients a1 through a6 are also arbitrarily varied. These coefficients are adjusted by an operator whenever necessary. The description of black print signal circuits for producing a black print is omitted for simplifying the explanation.

The correction system of the prior art mainly aims at eliminating incompleteness which means that the spectral characteristics of the inks overlap to a considerable extent. The masking circuits 4 through 6 attain such an object, being supplemented by an operator of the scanner who sets coefficients appropriately for producing prints with an accurate color rendition. The system therefore does not consider the correction of improperly absorbed components of color elements in an original image which are contained in the density signals $Y_0$, $M_0$, $C_0$ obtained by photo-electronic scanning of the color image. Improperly absorbed components of color elements refer to those color elements having undesired spectral transmittances (e.g.—color dyes, color pigment inks, etc.). It is impossible to know the exact amount of these color elements. The weights of respective components in the corrected density signals $Y_1$, $M_1$, $C_1$ which are to be inputted at the color correction signal generating circuit 7 are not always equal. Hue signals (Y), (G), (C), (B), (M), (R) are produced from the color correction signal generating circuits 7 based on the density signals $Y_1$, $M_1$, $C_1$. When a neutral color portion of an original image is scanned, the hue signals of all the 6 types should be zero. But if the weight of the density signals $Y_1$, $M_1$, $C_1$ is not equal, either one of the hue signals with a positive value is outputted and a correction signal implying as if the image is colored may be outputted accidentally. There cannot be more than two hue signals with a positive value. In other words, as the system conducts computation using symmetrical formulas on the 3 color signals, if the weight of respective signals is not equal, the image is discriminated to be a hue different from the actual hue, especially near the neutral color portion (gray), thereby producing undesirable tones in the reproduced picture image. When a noise or an error occurs in the color signal in the process prior thereto, a similar phenomenon may occur.

The hue signals (Y), (G), ..., (R) used may be obtained by computation using the basic three color signals. Since the color in the original image belongs to one of the six hues of blue, cyan, green, yellow, red and magenta which are obtained by dividing a color space into six portions, the computation of one hue signal or the computation of at most two hue signals adjacent to the color of the original image would suffice. This relationship is shown in FIG. 3. However, since it is impossible to decide before computation to which hue it should be classified, all of the hue signals must be computed. If, in order to carry this out in an analog circuit, the number of circuits corresponding to the number of hues should be prepared so as to conduct parallel computation and circuits should be adjusted; this is not only troublesome but is likely to cause greater errors. If such a system is constructed exclusively by digital circuits, on the other hand, the space required by the circuits for parallel computation becomes large, pushing up the cost. Although hue signals may be computed by digital circuits in time sequence, the speed is slow compared to the parallel computation.

There has been proposed a circuit using digital operation in order to avoid the temperature dependency or chronological changes of analog circuit components which used to be utilized in the prior art color correction circuits. For instance, as disclosed in Japanese Laid-open Patent Application No. 123201/1978, for executing high-speed real time processing, a memory table of the outputs $Y_2$, $M_2$, $C_2$ corresponding to the input density signals $Y_0$, $M_0$, $C_0$, and interpolation are employed to avoid a large capacity memory. However, if input data is used as address as a means of digitalizing color computation and a memory table which has been written-in with output data is accessed, the memory table has to be prepared prior to actual scanning. Further, it is inconvenient in that the output data $Y_2$, $M_2$, $C_2$ must be computed for all the combinations of the input density signals $Y_0$, $M_0$, $C_0$. When coefficients which used to be set by a potentiometer in the analog circuit had to be varied, those computations must be redone for all the memory tables. Such procedures are not only complicated but might require operations extremely different from the conventional method. Even if the system is structured to divide the color computation into plural steps, to prepare such memory tables as mentioned above on each step, and to re-write only the tables which are related to the change of coefficients would not achieve the effectiveness which justifies all the trouble. If interpolation is employed in order to reduce the memory capacity, there runs a higher possibility of making output data unnatural by errors in computation. In order to avoid such mistakes, more complicated interpolation will be additionally needed, thereby incapacitating real time processing.

SUMMARY OF THE INVENTION

Accordingly, the principal object of the present invention is to provide a color correction method which can obviate above mentioned problems and the apparatus therefor. The method is adapted to equalize the weights of the three signals processed in the color processing operation of the picture image signal output, whereby the six hue signals produced from the weighted signals divide a color space when such method is used to photo-electronically scan a color original image and then reproduce a picture image by digitally processing the tone.

Another object of this invention is to provide a tone correction circuit which can obviate the aforementioned defects and inconveniences.

In other words, in the present invention, six hue signals (magenta, blue, cyan, green, yellow, and red) are generated from three color density signals (yellow, magenta, and cyan), and that these six hue signals are made to equally divide a color space. Three color correction signals as defined below are generated for a given color:

$$Y_{CC} = k_{1j} \cdot H_1 + k_{1k} \cdot H_2$$

$$M_{CC} = k_{2j} \cdot H_1 + k_{2k} \cdot H_2$$

$$C_{CC} = k_{3j} \cdot H_1 + k_{3k} \cdot H_2$$

where $k_{1j}$, $k_{1k}$, $k_{2j}$, $k_{2k}$, $k_{3j}$, and $k_{3k}$ are predetermined coefficients, and $H_1$ and $H_2$ are hue signals, all of which are defined in the table below:

| Y:M:C | $H_1$ | $H_2$ | $k_{1j}, k_{2j}, k_{3j}$ | $k_{1k}, k_{2k}, k_{3k}$ |
|---|---|---|---|---|
| C>M>Y | C-M | M-Y | C | B |
| M>Y>C | M-Y | Y-C | M | R |
| M>C>Y | M-C | C-Y | M | B |
| Y>C>M | Y-C | C-M | Y | G |
| C>Y>M | C-Y | Y-M | C | G |
| Y>M>C | Y-M | M-C | Y | R |

The coefficients $k_{1j}$, $k_{2j}$, and $k_{3j}$ are selected to adjust the level of the predominant primary color component (yellow, magenta, or cyan)—for example, cyan (C) in the case where C>M>Y, shown in the first line of the table. The coefficients $k_{1k}$, $k_{2k}$, and $k_{3k}$ are selected to adjust the level of predominant secondary color component (blue, green, or red)—for example, blue (B) in the case where C>M>Y.

Essentially, the present invention involves generating three color correction signals by ranking the three color separation signals, Y, M, and C in order from largest to smallest (for example, C, M, Y), taking the difference between the two largest (C−M) and between the two smallest (M−Y), multiplying those differences by predetermined coefficients depending on which signal is to be corrected (Y, M, or C), and adding the results of the two multiplications to obtain the color correction signal for the color separation signal in questions (Y, M, or C).

The nature, principle and utility of the invention will become more apparent from the following detailed description when read in conjunction with the accompanying drawings.

BRIEF DESCRIPTION OF THE DRAWINGS

In the accompanying drawings:

FIG. 6 is a block diagram to show another embodiment of the hue discriminating circuit.

DETAILED DESCRIPTION OF THE INVENTION

This invention concerns a method and apparatus for digital color correction, which obtains and then converts input color separation signals of an original image to digital signals respectively, multiplies those digital color separation signals by predetermined coefficients and accumulates them for the equivalent neutral density conversion which produces an equal level at a gray point, obtains the divided hue signals such as yellow (Y), green (G), cyan (C), blue (B), magenta (M), and red (R) from equivalent neutral density signals which are produced by the equivalent neutral density conversion, multiplies those signals by correction coefficients and adds them to obtain color correction signals for yellow, magenta and cyan.

Figure 1:
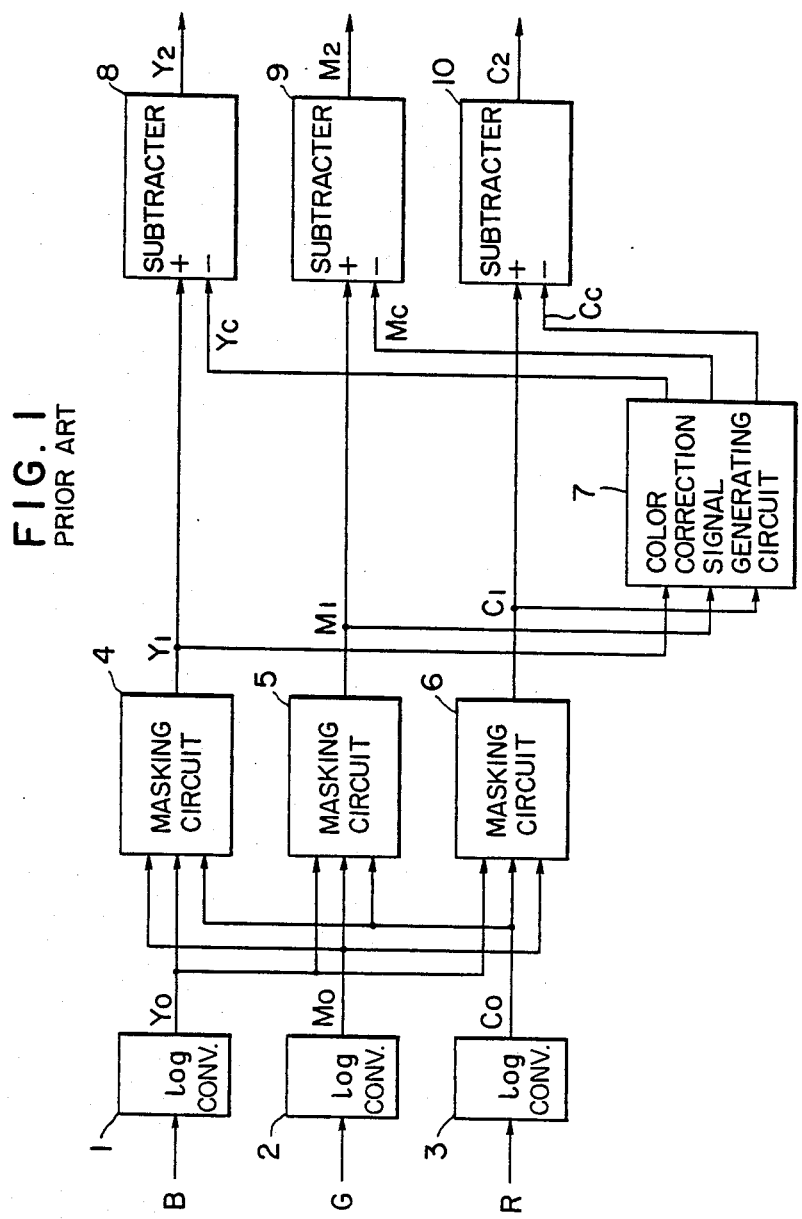
FIG. 1 is a block diagram to show an embodiment of the prior art color correction system.
Figure 2A:
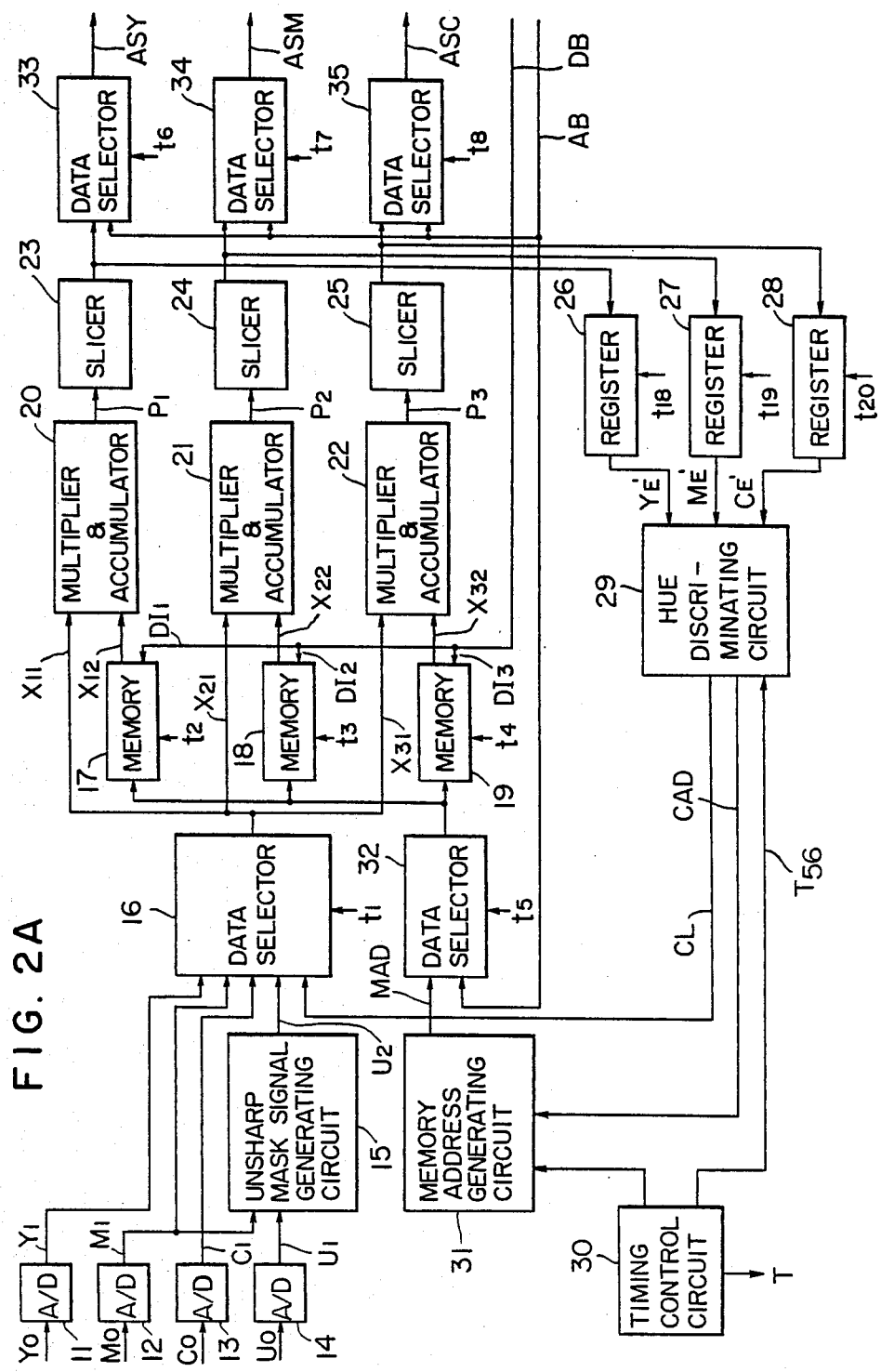
FIGS. 2A and 2B are block diagrams to show an embodiment of the apparatus according to the present invention.
Figure 2B:
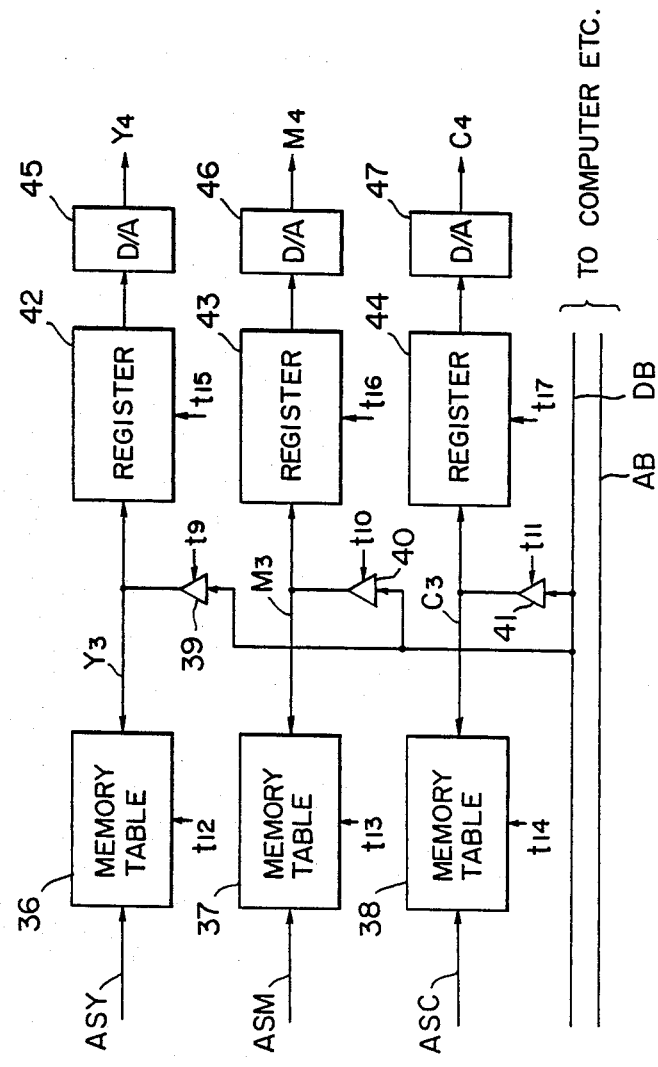

The operation thereof will now be explained referring to the circuit shown in FIGS. 2A and 2B.

Three color separation signals $Y_0$, $M_0$, $C_0$ which are obtained by photo-electronic scanning of a color original image and processed through color separation filters and logarithmic converters are inputted to A/D converters 11, 12 and 13, respectively. An unsharp signal $U_0$ which is obtained through a greater aperture and a logarithmic converter is inputted to an A/D converter 14. The digital density signals $Y_1$ through $C_1$ which are outputted from the A/D converters 11 through 13 are respectively inputted into a data selector 16. A digital unsharp signal $U_1$ supplied from the A/D converter 14 is inputted into an unsharp mask signal generating circuit 15 together with a digital density signal $M_1$ and an unsharp mask signal $U_2$ generated therein is inputted to the data selector 16. The outputs from the data selector 16 ($X_{11}$ to $X_{31}$) are fed to multiplier/accumulators 20 through 22 whose outputs $P_1$ through $P_3$ are fed to registers 26 to 28 as well as to data selectors 33 to 35 via slicers 23 to 25. The outputs $Y_E'$ to $C_E'$ from the registers 26 to 28 are inputted to a hue discriminating circuit 29. A hue signal CL which has been discriminated by the hue discriminating circuit 29 is inputted into the data selector 16, and a hue address signal CAD indicating which hue is being outputted is fed into a memory address generating circuit 31 and a memory address signal MAD from the memory address generating circuit 31 is inputted to memories 17 through 19 via the data selector 32.

The outputs ASY through ASC from the data selectors 33 to 35 are inputted respectively to memory tables 36 to 38 for gradation conversion and the hue data $Y_3$ through $C_3$ which has been gradation-converted in the memory tables 36 to 38 are inputted to D/A converters 45 to 47 for analog conversion respectively via registers 42 to 44 so as to be outputted as color-corrected hue signals $Y_4$ to $C_4$.

The outputs $X_{12}$ to $X_{32}$ from the memories 17 to 19 are inputted to multiplier/accumulators 20 to 22 while address data are inputted to the memories 17 to 19 via an address bus AB connected to a computer, etc. and the data selector 32. The memories are adapted to store the data (coefficient) which is transmitted by the data bus DB to the address designated by the abovenoted address data through input lines $DI_1$ to $DI_3$. The memory tables 36 to 38 store the data transmitted by the data bus DB at the address designated by the address data which has been inputted from the address bus AB through data selectors 33 to 35, by supplying the data through gates 39 to 41. These memories 17 to 19 and the memory tables 36 to 38 are constructed with RAMs (Random Access Memories). The memory address generating circuit 31 and the hue discriminating circuit 29 are timing controlled by a timing control circuit 30 so that the timing signals T ($t_1$ to $t_{20}$) respectively control the data selector 16, the memories 17 to 19, the data selectors 32 to 35, the gates 39 to 41, the memory tables 36 to 38 and the registers 26 to 28 and 42 to 44 with a predetermined timing.

In the structure mentioned above, the digital density signals $Y_0$, $M_0$, $C_0$ of the color original image which have been measured through the 3-color separation filter include improper absorption related to the color elements comprising the color original image and the filter. The weights of these three digital density signals $Y_0$ to $C_0$ are not necessarily equal to each other. However, the above mentioned two problems may be eliminated by operating the equivalent neutral density conversion indicated below.

$$\begin{bmatrix} Y_E \\ M_E \\ C_E \end{bmatrix} = \begin{bmatrix} a11 & a12 & a13 \\ a21 & a22 & a23 \\ a31 & a32 & a33 \end{bmatrix} \begin{bmatrix} Y_1 \\ M_1 \\ C_1 \end{bmatrix} \quad (1)$$

The matrix elements aij in the above formula (1) are constants which can be determined by the color element system of the color original image and the color separation filter and are set at values which make $Y_E$, $M_E$, $C_E$ on the same level when the gray portion of the image is measured. Since the formula (1) above is expressed in the sum of the multiplication of the constant aij by the signals $Y_1$, $M_1$, $C_1$, for instance $Y_E = a11 \cdot Y_1 + a12 \cdot M_1 + a13 \cdot C_1$, it is executable by carrying out multiplication and then addition thereof for $Y_E$, $M_E$, $C_E$ consecutively. The coefficient data $DI_1$ (a11 to a14 and k11 to k16), $DI_2$ (a21 to a24 and k21 to k26) and $DI_3$ (a31 to a34 and k31 to k36) transmitted from a computer, etc. through the data bus DB have been written-in preliminarily at the address designated by the address data transmitted from a computer, etc. through the address bus AB. The coefficients a14, a24, a34, k11 to k16, k21 to k26 and k31 to k36 will be described below. The multiplier/accumulators 20 to 22 are adapted to multiply the digital density signals $Y_1$ to $C_1$ transmitted through the data selector 16 by the coefficients stored in the memories 17 to 19, and to accumulate the resulting products.

The timing control circuit 30 first controls the data selector 16 with the timing signal $t_1$ to select the digital density signal $Y_1$ out of the input signals so as to feed it to the multiplier/accumulators 20, 21, 22. The memory address data from the memory address generating circuit 31 is added by the timing signal $t_5$ to the address lines of the memories 17 to 19 via the data selector 32. As a result, the coefficient a11 is outputted from the memory 17, the coefficient a21 from the memory 18, and the coefficient a31 from the memory 19 to be fed to the multiplier/accumulators 20, 21, 22, respectively. Thus, the products a11·$Y_1$, a21·$Y_1$, a31·$Y_1$ are respectively outputted to the outputs $P_1$, $P_2$, $P_3$ of the multiplier/accumulators 20, 21 and 22. (timing I for the above).

With the next timing II, a digital density signal $M_1$ is selected from the data selector 16 to be inputted to the multiplier/accumulators 20 to 22 while the memory address signal MAD from the memory address generating circuit 31 selects the coefficient a12 which is stored in the memory 17 via the data selector 32 as well as a coefficient a22 stored in the memory 18 and a coefficient a32 stored in the memory 19 so as to feed them to the multiplier/accumulators 20, 21, 22. Accordingly, the digital density signals $M_1$ and the coefficients a12 to a32 are multiplied in the multiplier/accumulators 20 to 22 and the product thereof is added to the result of the previous multiplication. Therefore, the respective outputs $P_1$, $P_2$, $P_3$ of the multiplier/accumulators 20, 21, 22 are fed with a11·$Y_1$+a12·$M_1$, a21·$Y_1$+a22·$M_1$, a31·$Y_1$+a32·$M_1$.

With the next timing III, since the digital density signal $C_1$ is selected from the data selector 16 and inputted to the multiplier/accumulators 20 to 22, while coefficients a13, a23, a33 are respectively outputted from the memories 17 to 19 to be fed to the multiplier/accumulators 20 to 22, the result $P_1$, $P_2$, $P_3$ of the multiplication and accumulation by the multiplier/accumulators 20, 21, 22 become respectively a11·$Y_1$+a12·$M_1$+a13·$C_1$, a21·$Y_1$+a22·$M_1$+a23·$C_1$, a31·$Y_1$+a32·$M_1$+a33·$C_1$.

As indicated above, with the timings I to III, the outputs $P_1$ to $P_3$ of the multiplier/accumulators 20 to 22 receive the equivalent neutral density $Y_E$, $M_E$, $C_E$ which is expressed by the formula (2), which is a modification of the formula (1);

$$\left. \begin{aligned} Y_E &= a11 \cdot Y_1 + a12 \cdot M_1 + a13 \cdot C_1 \\ M_E &= a21 \cdot Y_1 + a22 \cdot M_1 + a23 \cdot C_1 \\ C_E &= a31 \cdot Y_1 + a32 \cdot M_1 + a33 \cdot C_1 \end{aligned} \right\} \quad (2)$$

The equivalent neutral densities $Y_E$, $M_E$, $C_E$ thus obtained are stored in the registers 26 to 28 (as $Y_E'$, $M_E'$, $C_E'$) via the slicers 23 to 25. The slicers 23 to 25 are operated to output the predetermined maximum or the minimum values when the input ($Y_E$ to $C_E$) exceeds those predetermined values. During the above mentioned timings I to III, an unsharp mask signal $U_2$ is generated in the unsharp mask signal generating circuit 15. In this case, the unsharp mask signal $U_2$ is computed by the formula, $U_2 = M_1 - U_1$.

With the next timing IV, an unsharp mask signal $U_2$ is outputted from the data selector 16 and is inputted to the multiplier/accumulators 20 to 22 together with the coefficients a14 to a34 which have been selectively outputted from the memories 17 to 19. Since the multiplier/accumulators 20 to 22 multiply the input unsharp mask signal $U_2$ and the coefficients a14 to a34, and then add the products thereof to the accumulation $Y_E$ to $C_E$, the results, $Y_S$ to $C_S$, of the formula below will be outputted to the outputs $P_1$ to $P_3$ thereof.

$$Y_S = Y_E + a14 \cdot U_S \\ M_S = M_E + a24 \cdot U_S \\ C_S = C_E + a34 \cdot U_S \quad (3)$$

With the next timing V, selective color correction computation is conducted wherein selective color correction is expressed by $Y_C = Y_S + Y_{CC}$, $M_C = M_S + M_{CC}$, $C_C = C_S + C_{CC}$ using $Y_{CC}$, $M_{CC}$, $C_{CC}$ as the correction signals. The correction signals $Y_{CC}$, $M_{CC}$, $C_{CC}$ are expressed by the formula below:

$$Y_{CC} = k11 \cdot (Y) + k12 \cdot (G) + k13 \cdot (C) + \\ k14 \cdot (B) + k15 \cdot (M) + k16 \cdot (R) \\ M_{CC} = k21 \cdot (Y) + k22 \cdot (G) + k23 \cdot (C) + \\ k24 \cdot (B) + k25 \cdot (M) + k26 \cdot (R) \\ C_{CC} = k31 \cdot (Y) + k32 \cdot (G) + k33 \cdot (C) + \\ k34 \cdot (B) + k35 \cdot (M) + k36 \cdot (R) \quad (4)$$

Figure 3:
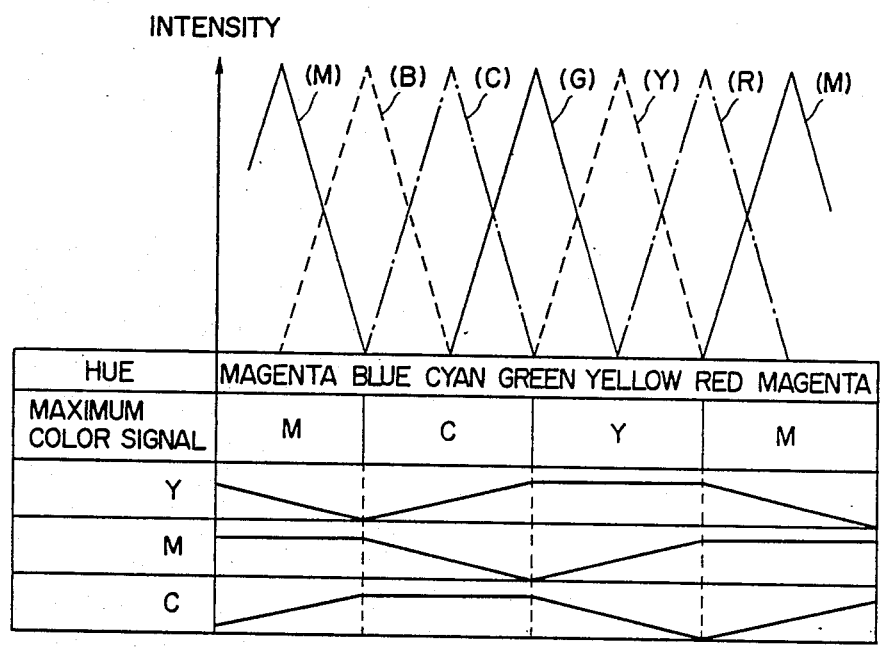
FIG. 3 shows a portion of the operation of the apparatus in FIG. 2A.

(Y), (G), (C), (B), (M) and (R) are hue signals which are obtained by dividing all hues as shown in FIG. 3 in accordance with Table 2 described hereinafter. Although Table 2 does not show the case of the equivalent neutral density, it is easily applicable to the equivalent neutral density. The hue signals (Y) to (R) are different from the digital separation signals, respectively. That is, the present of ( ) means the hue of colors and therefore the meanings of, for example (Y) and Y are different. The hue signals (Y) to (R) are generated in the hue discriminating circuit 29 during the above mentioned timing IV. As is clear from FIG. 3, since two of the six hue signals at most are outputted for each one of color tones, it would suffice if the operation of multiplying and adding the coefficient kij is conducted by the multiplier/accumulators 20 to 22 for these two hue signals alone. Thus, (C) and (G) are outputted if the hue is a middle hue between cyan and green. The system operates in a similar fashion for other hues. At most, two hue signals are output. In other words, one (CL) of the hue signals (Y) to (R) is outputted from the hue discriminating circuit 29 by the timing control of the timing control circuit 30 at the timing V, and is fed to the multiplier/accumulators 20 to 22 via the data selector 16. The coefficient kij is set at a desired value by an operator. A hue address signal CAD is transmitted from the hue discriminating circuit 29 to the memory address generating circuit 31 to indicate which hue signal is being outputted, and the memory address generating circuit 31 outputs a memory address signal MAD in order to read out a coefficient kij corresponding to the hue signal which is being outputted to the memory address generating circuit 31. By feeding this memory address signal MAD to the memories 17 to 19 via the data selector 32, the coefficient kij which has been stored in advance in the memories 17 to 19 is selectively outputted to be fed to the multiplier/accumulators 20 to 22. The result of the multiplication of the hue signals and the coefficient kij conducted in the multiplier/accumulators is added to the accumulation values $Y_S$, $M_S$, $C_S$ which have been obtained up to the last operation. At the next timing VI, as similar operation is conducted for another hue signal, thereby outputting $Y_C$, $M_C$, $C_C$ to the outputs $P_1$ to $P_3$ of the multiplier/accumulators 20 to 22.

As described above, the equivalent neutral density conversion is executed at the timings I through III, and the adding of the unsharp mask signal is then executed at the timing IV, and the adding of the selective color correction signal is finally executed at the timings V and VI. The hue signal for the selective color correction uses the equivalent neutral density in the foregoing. The accuracy and the stability of the selective color correction are respectively high due to the character of the equivalent neutral density in the case of generating the hue signal for the selective color correction from the equivalent neutral density. It is easy to store the signals $Y_S$, $M_S$, $C_S$ in the registers 26 through 28 via the slicers 23 through 25 after the timing IV and to put the stored signals to use for generating of the hue signal for the purpose of the selective color correction by timing-controlling of the control circuit 30.

Figure 4:
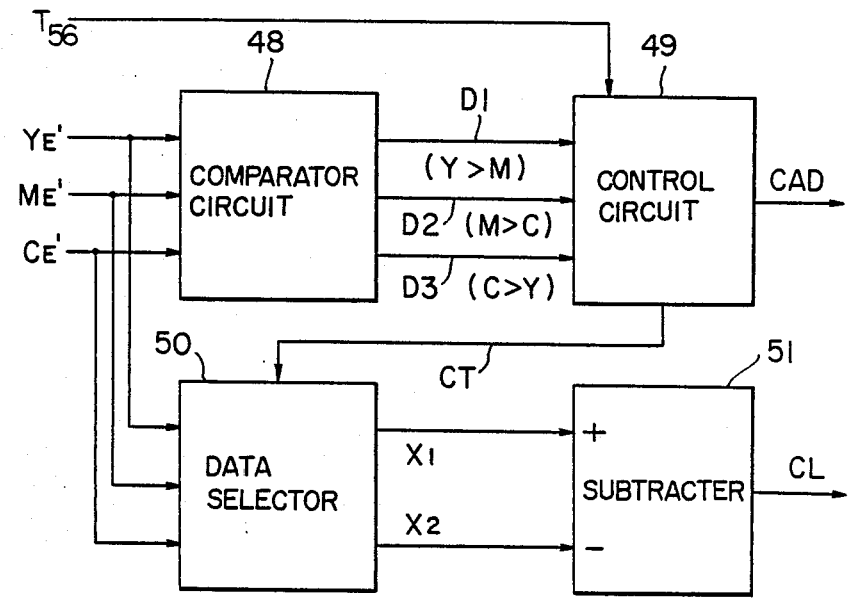
FIG. 4 is a block diagram to specifically show an embodiment of a hue discriminating circuit.

The above hue discriminating circuit 29 can be constructed, for instance, as shown in FIG. 4. The operation thereof will be explained below:

$Y_E'$, $M_E'$, $C_E'$ are inputted to a comparating circuit 48 and a data selector 50. The comparating circuit 48 transmits signals of 3 bits, $D_1$, $D_2$, $D_3$ to a control circuit 49 depending on the dimensional relation amount $Y_E'$, $M_E'$, $C_E'$. For instance, if the relationship is $Y_E' > M_E' > C_E'$, the output signal $D_1$, $D_2$, and $D_3$ from the comparating circuit 48 will become "1", "1", and "0", respectively. Based on the above, the control circuit 49 outputs a control signal CT so that at the first timing ($T_{56} = $"0") the data selector 50 can select $Y_E'$, $M_E'$ to output them to the outputs $X_1$, $X_2$ and at the second timing ($T_{56} = $"1"), $C_E'$. The $Y_E'$ and $M_E'$ which are outputted to the outputs $X_1$, $X_2$ of the data selector 50 at the timing 1 are transmitted to the addition input and the subtraction input terminals of the subtracter 51 while the output of the subtracter 51 receives the subtraction result $CL = Y_E' - M_E'$. At the subsequent timing 2, the outputs $X_1$, $X_2$ of the data selector 50 are similarly fed with $M_E'$ and $C_E'$ and the output of the subtracter 51 receives the subtraction result of $CL = M_E' - C_E'$. The signals CL output at the first and second timings above correspond to hue signals (Y) and (R), respectively. The hue discriminating circuit 29 will be further discussed below.

Table 1 shows the relationship between the inputs $X_{11}$, $X_{12}$ and the output $P_1$ at the timings I to VI. A similar relationship holds for other input lines $X_{21}$, $X_{31}$, $X_{22}$, $X_{32}$ and the outputs $P_2$, $P_3$.

TABLE 1

| Timing | $X_{11}$ | $X_{12}$ | $P_1$ |
|---|---|---|---|
| I | $Y_1$ | a11 | $a11 \cdot Y_1$ |
| II | $M_1$ | a12 | $a11 \cdot Y_1 + a12 \cdot M_1$ |
| III | $C_1$ | a13 | $a11 \cdot Y_1 + a12 \cdot M_1 + a13 \cdot C_1 \, (= Y_E)$ |
| IV | $U_2$ | a14 | $Y_E + a14 \cdot U_2 \, (= Y_S)$ |
| V | CLi | kli | $Y_S + kli \cdot CLi$ |
| VI | CLj | klj | $Y_S + kli \cdot CLi + klj \cdot CLj \, (= Y_C)$ |

The series of multiplications and additions end as shown above. The obtained hue signals $Y_C$, $M_C$, $C_C$ become address signals ASY, ASM, ASC of the memory tables 36 to 38 for gradation conversion through the slicers 23 to 25 and the data selectors 33 to 35. The memory tables 36 to 38 comprise a data table wherein one input corresponds to one output. If an arbitrary data is written-in preliminarily as a value corresponding to an address, desired gradation conversion can be attained. The hue signals $Y_3$, $M_3$, $C_3$ which have been gradation-converted in those memories 36 to 38 are transmitted via registers 42 to 44 for latch to the D/A converters 45 to 47, and then converted to analog values for output.

In the case when a coefficient data is written in the memories 17 to 19, the address signal thereof is outputted from a computer, etc. to the address bus AB, applied to the address line of the memories 17 to 19 via the data selector 32, and at the same time a coefficient data is outputted to the data bus DB and applied to the data input lines $DI_1$ to $DI_3$ of the memories 17 to 19, thereby successively writing in the coefficient data at the addresses designated by the input of the write-in strobed signal ($t_2$ to $t_4$). At such a time the data selector 32 operates to select address signals from outside. Similarly, in the case when data is to be written in the memory tables 36 to 38, an address signal on the address bus AB is supplied to the address lines (ASY to ASC) of the memory tables 36 to 38, and the data on the data bus DB is then supplied to the data input/output line of the memory tables 36 to 38 via the gates 39 to 41, thereby successively writing in the gradation conversion data at the addresses designated by the input of the write-in strobed signals ($C_{12}$ to $t_{14}$).

No explanation was given in the foregoing for the black signal (BK) which is necessary when preparing a separation printer for printing. The black print signals can be generated in parallel to the selective color correction by taking out $Y_S$, $M_S$, $C_S$ from the output $P_1$ to $P_3$ at the time when the operations have been completed until the timing IV, and inputting then separately into a black printer signal generating circuit for the operation at the timings V and IV for a black printer signal generation. The coefficients which are to be stored in the memories 17 to 19 are arbitrary. An alternative is, therefore, that the coefficients corresponding to various color original image materials are stored in advance in either a RAM or ROM (Read Only Memory) in coordination. When one of these color original images is designated, the coefficient corresponding thereto may be selectively outputted by a separate selection means (either manual or automatic) which is responsive thereto. In such a case, the coefficient may be set by a digital switch, etc. Although the unsharp mask signal $U_2$ is operated by the formula ($M_1 - U_1$) in the foregoing, the formula may be either ($Y_1 - U_1$) or ($C_1 - U_1$), and the unsharp signal $U_1$ may be subtracted from the synthetic signals $Y_1$ to $C_1$.

According to the present invention, a color space is divided into the six hues, i.e. magenta (M), blue (B), cyan (C), green (G), yellow (Y) and red (R). A given color can be expressed not only by one hue and may be located between two hues, such that the delicate hue can be represented by the distance from the center of each hue. This invention, therefor, employs as shown in FIG. 3, the hue signals (M), (B), (C), (G), (Y), and (R) having values which become maximum at the respective centers of the six hues and symmetrically and gradually reduce to zero at the center of the adjacent two hues. However, as is obvious from FIG. 3, since at most two of the hue signals (M) to (R) can be outputted for an arbitrary tint, the hue signal to be outputted next is predictable due to the sizewise relationship of the basic color signals Y, M and C as shown below in Table 2.

TABLE 2

| Y:M:C | hue signal I (t1) | hue signal II (t2) |
|---|---|---|
| C ≧ M ≧ Y | (C) = C − M | (B) = M − Y |
| M ≧ Y ≧ C | (M) = M − Y | (R) = Y − C |
| M ≧ C ≧ Y | (M) = M − C | (B) = C − Y |
| Y ≧ C ≧ M | (Y) = Y − C | (G) = C − M |
| C ≧ Y ≧ M | (C) = C − Y | (G) = Y − M |
| Y ≧ M ≧ C | (Y) = Y − M | (R) = M − C |

It is obvious from Table 2 where in a case that the sizewise relationship is C>M>Y, the hue signal (C) can be obtained by the formula:

$$(C) = C - M$$

and the hue signal (B) is obtained by the formula $$(B) = M - Y$$

In other words, the image signals Y, M and C are arranged in order of level value thereof, the hue signal I is obtained by subtracting the middle signal from the maximum signal and the hue signal II is obtained by subtracting the minimum signal from the middle signal. The hue signal I corresponds to a hue of the maximum signal and the hue signal II corresponds to a hue of the complementary color of the minimum signal.

In the above case, wherein the sizewise order is C, M and Y, therefore, two hue signals (C) and (B) can be obtained almost in parallel if the hue signal (C) is obtained from C−M at the first timing $t_1$ and the hue signal (B) is obtained from M−Y at the second timing $t_2$. The hue discriminating circuit 29 in accordance with the present invention is constructed based upon such a principle as above which will be described again referring to FIG. 4.

Figure 5:
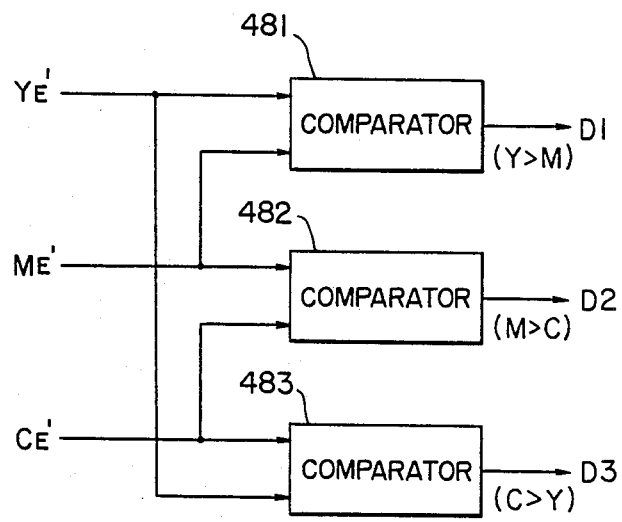
FIG. 5 is a block diagram to shown an embodiment of a comparator to be used in the hue discriminating circuits.

The circuit is arranged such that the color separation signals obtained by photo-electronic scanning of a color original image are processed by the basic operation, and digitalized color signals $Y_E'$, $M_E'$, $C_E'$ are inputted to the comparing circuit 48 as well as to the data selector 50, and binary signals of 3 bits $D_1$ to $D_3$ are outputted from the comparing circuit 48 based upon the sizewise comparison of the color separation signals Y, M, C. FIG. 5 shows an example of the comparing circuit 48 wherein comparators 481 to 483 discriminate two inputs sizewise. The discriminating signal D1 becomes "1" when the color separation signal Y is greater than the level of the color separation signal M, (Y>M), the discriminating signal D2 becomes "1" when the color separation signal M is greater than the color separation signal C, (M>C), and the discriminating signal D3 becomes "1" when the color separation signal C is greater than the color separation signal Y, (C>Y). These discriminating signals D1 to D3 are inputted to the control circuit 49 and the control circuit 49 responds to the combination of these discriminating signals D1 to D3 and inputs a control signal CT to the data selector 50. The control circuit 49 outputs control signal CT to the data selector 50 for outputting the color separation signals $X_1$, $X_2$ corresponding to the combination of the discriminating signals D1 to D3 at the timing $t_1$, $t_2$ as shown in Table 3. The two color separation signals $X_1$, $X_2$ selected by the data selector 50 are inputted to the subtracter 51 and the difference between them ($X_1 - X_2$) is outputted as a correction hue signal CL.

TABLE 3

| D1 (Y > M) | D2 (M > C) | D3 (C > Y) | Y:M:C | timing $t_1$ $X_1$ | $X_2$ | timing $t_2$ $X_1$ | $X_2$ |
|---|---|---|---|---|---|---|---|
| 0 | 0 | 0 | Y = M = C | * | * | * | * |
| 0 | 0 | 1 | C ≧ M > Y<br>C > M ≧ Y | C | M | M | Y |
| 0 | 1 | 0 | M ≧ Y > C<br>M > y ≧ C | M | Y | Y | C |
| 0 | 1 | 1 | M > C > Y | M | C | C | Y |
| 1 | 0 | 0 | Y ≧ C > M<br>Y > C ≧ M | Y | C | C | M |
| 1 | 0 | 1 | C > Y > M | C | Y | Y | M |
| 1 | 1 | 0 | Y > M > C | Y | M | M | C |
| 1 | 1 | 1 | — | * | * | * | * |

In the structure shown above, if the level of the color separation signals Y, M, C, lowers in that order (Y>M>C), the discriminating signals D1 and D2 becomes "1" and the discriminating signal D3 becomes "0" as obvious from Table 3. Judging from such state, the control circuit 49 outputs first at the timing $t_1$ a color separation signal Y as $X_1$ from the data selector 50 as well as the color separation signal M as $X_2$. The subtracter 51 accordingly performs the subtraction Y—M, to output the hue signal (Y) as the correction hue signal CL. At the subsequent timing $t_2$, the color separation signal M is outputted as $X_1$ and the color separation signal C as $X_2$. The subtracter 51 performs the calculation M—C to output the hue signal (R) as the correction hue signal CL. The color tone is corrected as shown above by multiplying the correction hue signals CL ($t_1$), CL ($t_2$) output at the timings $t_1$ and $t_2$ by corresponding constants and adding the results for the basic color signals. Since the sizewise relationship of the color separation signals can be discriminated from Table 3, at each timing a hue signal is transmitted. The symbol * in Table 3 denotes the state where any of the color separation signals Y, M, C can be inputted.

FIG. 6 indicates another embodiment of the present invention including a threshold data memory 60 for storing threshold data for respective hues, a subtracter 61 for subtracting the threshold data $T_H$ selectively output from the threshold data memory 60 from the hue signal CL output from the subtracter 51 and an AND circuit 62 for obtaining a AND product of both positive and negative code signals SG responsive to the subtraction result and the subtracter output (CL—$T_H$) from the subtracter 61. The threshold data memory 60 comprises a ROM or a RAM and is adapted to be arbitrarily set a threshold value correspondingly to each hue to be stored at a predetermined address. The threshold value $T_H$ which has been stored in the threshold data memory 60 is selectively outputted by the address signal CAD output from the control circuit 49 responsive to the state of the discriminating signals D1 to D3. The code signal SG output from the subtracter 61 becomes "1" when (CL—$T_H$) is 0 or more, and "0" when (CL—$T_H$) is negative, (CL—$T_H$) <0. When (CL—$T_H$) is positive, AND circuit 62 outputs (CL—$T_H$) as is as a correction hue signal CL'. When (CL—$T_H$) is 0 is less, the correction hue signal CL' becomes "0".

As described in the foregoing, the digital color correction system and the apparatus therefor can make three color signals equivalent by conducting a process to convert the basic three color signals to the equivalent neutral density of the color elements of the original image. In other words, when scanning the gray portion of the original image, the levels of the three hue signals become completely identical. Without using large storage capacity interpolation memory tables, but simply by inputting the operative color signals and the operational coefficients which have been written in the memory into high speed multipliers consecutively at a proper timing, multiplying and accumulating the same and continuously operating, it is possible to realize a circuit which enables color processing computation in real time.

The color correction circuit in accordance with the present invention can successively discriminate hue signals before the operation thereof, and operates two hue signals at most, thereby enabling real time operation at a higher speed but with a smaller circuit construction. By setting a threshold value on the hue signals, it can prevent errors in hue judgement which otherwise might be caused especially around neutral colors of a low saturation.

The description in the foregoing has been given for positive logic with respect to comparing circuits, etc., but a similar operation is applicable for negative logic circuits.

What is claimed is:

1. A method for processing picture image signals comprising the steps of: detecting color separation signals (B, G, R) corresponding to a color original image and respectively converting said color separation signals into digital color separation signals ($Y_1$, $M_1$, $C_1$); multiplying said digital color separation signals by predetermined coefficients (a11 to a33) and sequentially storing the results of said multiplication for equalizing the levels of said digital color separation signals at a gray point of said original image and obtaining digital color separation signals ($Y_E$, $M_E$, $C_E$) which have been converted to equivalent neutral densities by an equivalent neutral density conversion in accordance therewith; obtaining hue signals of yellow (Y), green (G), cyan (C), blue (B), magenta (M), and red (R) which divide a color space into six hues from said digital color separation signals which have been converted to equivalent neutral densities; obtaining pairs of said hue signals, multiplying the hue signals of said pairs by respective predetermined color correction coefficients, and storing the results of said multiplication and obtaining yellow, magenta, and cyan color correction signals ($Y_{cc}$, $M_{cc}$, $C_{cc}$) in accordance therewith; and adding said digital color separation signals which have been converted to equivalent neutral densities and said color correction signals, so as to thereby obtain selectively color-corrected signals ($Y_c$, $M_c$, $C_c$) for recording said original image.

2. A method for processing picture image signals as claimed in claim 1, wherein said color separation signals (B, G, R) are obtained by photo-electronically scanning said color original image through color separation filters, and then converting said color separation signals to three color density signals through logarithmic converters.

3. A method for processing picture image signals as claimed in claim 1, wherein said equivalent neutral density conversion is performed using the formula:

$$\begin{bmatrix} Y_E \\ M_E \\ C_E \end{bmatrix} = \begin{bmatrix} a11 & a12 & a13 \\ a21 & a22 & a23 \\ a31 & a32 & a33 \end{bmatrix} \begin{bmatrix} Y_1 \\ M_1 \\ C_1 \end{bmatrix}$$

wherein said digital color separation signals $Y_1$, $M_1$, $C_1$, and said predetermined coefficients are aij, and said digital color separation signals which have been converted to equivalent neutral densities are $Y_E$, $M_E$, $C_E$.

4. A method for processing picture image signals as claimed in claim 3, wherein said equivalent neutral density conversion is performed in a time sharing manner.

5. A method for processing picture image signals as claimed in claim 1, wherein obtaining said equivalent neutral density conversion and obtaining said color-corrected signals are performed in multiplier/accumulators in a time sharing manner.

6. A method for processing picture image signals comprising the steps of: detecting color separation signals (B, G, R) corresponding to a color original image and respectively converting said color separation signals into digital color separation signals ($Y_1$, $M_1$, $C_1$); obtaining an unsharp mask signal ($U_s$) from an unsharp signal of said original image obtained through an aperture and at least one of said color separation signals; multiplying said digital color separation signals by predetermined coefficients (a11 to a33) and sequentially storing the results of said multiplication for equalizing the levels of said digital color separation signals at a gray point of said original image and obtaining digital color separation signals ($Y_E$, $M_E$, $C_E$) which have been converted to equivalent neutral densities by an equivalent neutral density conversion in accordance therewith; obtaining the products of said unsharp mask signal multiplied by predetermined coefficients (a14, a24, a34); obtaining hue signals of yellow (Y), green (G), cyan (C), blue (B), magenta (M) and red (R) which divide a color space into six hues from said digital color separation signals which have been converted to equivalent neutral densities; obtaining pairs of said hue signals, multiplying the hue signals of said pairs by respective predetermined color correction coefficients, and storing the results of said multiplication and obtaining yellow, magenta, and cyan color correction signals ($Y_{cc}$, $M_{cc}$, $C_{cc}$) in accordance therewith; and adding said color correction signals, said digital color separation signals which have been converted to equivalent neutral densities and said products of said unsharp mask signal multiplied by said predetermined coefficients so as to thereby obtain selectively color-corrected signals for recording said original image.

7. A method of processing picture image signals as claimed in claim 6, wherein said color separation signals (B, G, R) are obtained by photo-electronically scanning said color original image through color separation filters, and said color separation signals (B, G, R) are converted to three color density signals through logarithmic converters.

8. A method of processing picture image signals as claimed in claim 6, wherein said equivalent neutral density conversion is performed using the formula:

$$\begin{bmatrix} Y_E \\ M_E \\ C_E \end{bmatrix} = \begin{bmatrix} a11 & a12 & a13 \\ a21 & a22 & a23 \\ a31 & a32 & a33 \end{bmatrix} \begin{bmatrix} Y_1 \\ M_1 \\ C_1 \end{bmatrix}$$

wherein said digital color separation signals are $Y_1$, $M_1$, $C_1$, and said predetermined coefficients are aij, and said digital color separation signals which have been converted to equivalent neutral densities are $Y_E$, $M_E$, $C_E$.

9. A method of processing picture image signals as claimed in claim 8, wherein said equivalent neutral density conversion is performed in a time sharing manner.

10. A method of processing picture image signals as claimed in claim 6, wherein obtaining said equivalent neutral density conversion and obtaining said color correction signals are performed in a multiplier/accumulators a time sharing manner.

11. An apparatus for processing picture image signals comprising:
 (a) A/D converters which convert color separation signals of an original image to digital color separation signals;
 (b) multiplier/accumulators for receiving said digital color separation signals via a first data selector;
 (c) memories for outputting selected coefficients to said multiplier/accumulators;
 (d) a hue discriminating circuit for receiving digital equivalent neutral density color separation signals obtained by multiplying said digital color separation signals by respective coefficients from said memories in said multiplier/accumulators and for outputting pairs of hue signals selected from yellow (Y), green (G), cyan (C), blue (B), magenta (M), and red (R) hue signals;
 (e) a second data selector for causing said memories to output the selected coefficients to said multiplier/accumulators;
 (f) memory tables for receiving said digital equivalent neutral density color separation signals and the results of multiplying the hue signals of said pairs of said hue signals by respective coefficients from said memories via third data selectors, said memory tables outputting gradation-converted color-corrected separation signals; and
 (g) a timing control circuit for controlling the operational timing of said first to third data selectors and said memories.

12. An apparatus as claimed in claim 11, further comprising an A/D converter for converting an unsharp signal of said original image obtained through an aperture to a digital unsharp signal and an unsharp mask signal generating circuit for producing an unsharp mask signal using said digital unsharp signal and at least one of said digital color separation signals.

13. An apparatus as claimed in claim 12, further comprising slicers for slicing output signals from said multiplier/accumulators and for inputting such sliced signals to said third data selectors.

14. An apparatus as claimed in claim 12, further comprising registers disposed between said hue discriminating circuit and said multiplier/accumulators.

15. An apparatus as claimed in claim 12, further comprising registers for storing outputs from said memory tables and D/A converters for converting outputs from said registers into analog values.

16. An apparatus as claimed in claim 11, further comprising slicers for slicing output signals from said multiplier/accumulators and for inputting such sliced signals to said third data selectors.

17. An apparatus as claimed in claim 11, further comprising registers disposed between said hue discriminating circuit and said multiplier/accumulators.

18. An apparatus as claimed in claim 11, further comprising registers for storing outputs from said memory tables and D/A converters which convert outputs from said registers into analog values.

19. An apparatus as claimed in claim 11, wherein said hue discriminating circuit comprises: comparators for comparing the magnitudes of said digital equivalent neutral density color separation signals; a fourth data selector for selecting two of said digital equivalent neutral density color separation signals as outputs; a control circuit for controlling said fourth data selector in a time sharing manner and for outputting a signal for causing the memories to output the selected coefficients based upon the result of said comparison effected in said comparators; and a subtracter for obtaining the difference between said two digital equivalent neutral density color separation signals output from said fourth data selector and for outputting said difference as one of the hue signals in the pairs of hue signals.

20. An apparatus as claimed in claim 11, wherein said hue discriminating circuit comprises: comparators for sizewise comparing said digital equivalent neutral density color separation signals; a fourth data selector for selecting two of said digital equivalent neutral density color separation signals as outputs; a threshold data memory for storing threshold data for respective ones of said hue signals; a control circuit for controlling said fourth data selector in a time sharing manner and for outputting a signal for causing the memories to output the selected coefficients based upon the result of said comparison effected in said comparators; a first subtracter for obtaining the difference between said two digital equivalent neutral density color separation signals output from said fourth data selector and for outputting the difference as a hue signal; a second subtracter which obtains the difference between said hue signal output from said first subtracter and corresponding threshold data selectively output from said threshold data memory in accordance with said signal for causing the memories to output the selected coefficients, and which outputs the obtained difference and a sign signal having a state corresponding to the sign of the obtained difference; and a logic circuit for outputting the logical AND product of the obtained difference output from said second subtracter and said sign signal output from said second subtracter as one of the hue signals in the pairs of hue signals.

* * * * *